(No Model.) 3 Sheets—Sheet 2.

C. W. RUSSELL.
VALVE DEVICE FOR COMPOUND ENGINES.

No. 550,565. Patented Nov. 26, 1895.

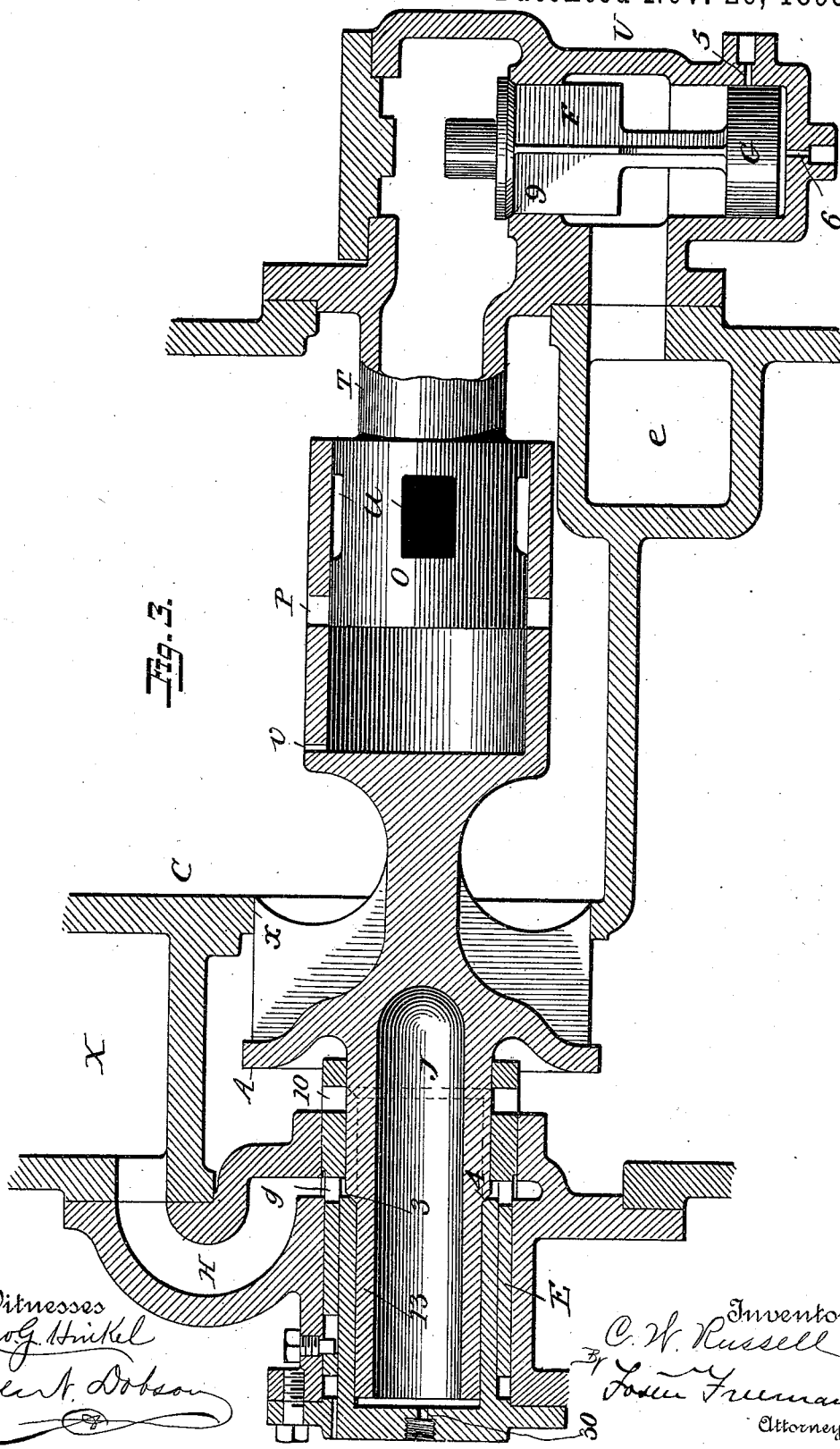

UNITED STATES PATENT OFFICE.

CLINTON W. RUSSELL, OF RICHMOND, VIRGINIA, ASSIGNOR TO THE RICHMOND LOCOMOTIVE AND MACHINE WORKS, OF SAME PLACE.

VALVE DEVICE FOR COMPOUND ENGINES.

SPECIFICATION forming part of Letters Patent No. 550,565, dated November 26, 1895.

Application filed April 7, 1894. Serial No. 506,770. (No model.)

*To all whom it may concern:*

Be it known that I, CLINTON W. RUSSELL, a citizen of the United States, residing at Richmond, in the county of Henrico and State of Virginia, have invented certain new and useful Improvements in Valve Devices for Compound Engines, of which the following is a specification.

My invention relates to that class of valve apparatus which is used in connection with compound engines; and my invention consists in so constructing the said apparatus as to facilitate the opening and closing of the respective valves, as fully set forth hereinafter, and as illustrated in the accompanying drawings, in which—

Figure 1:
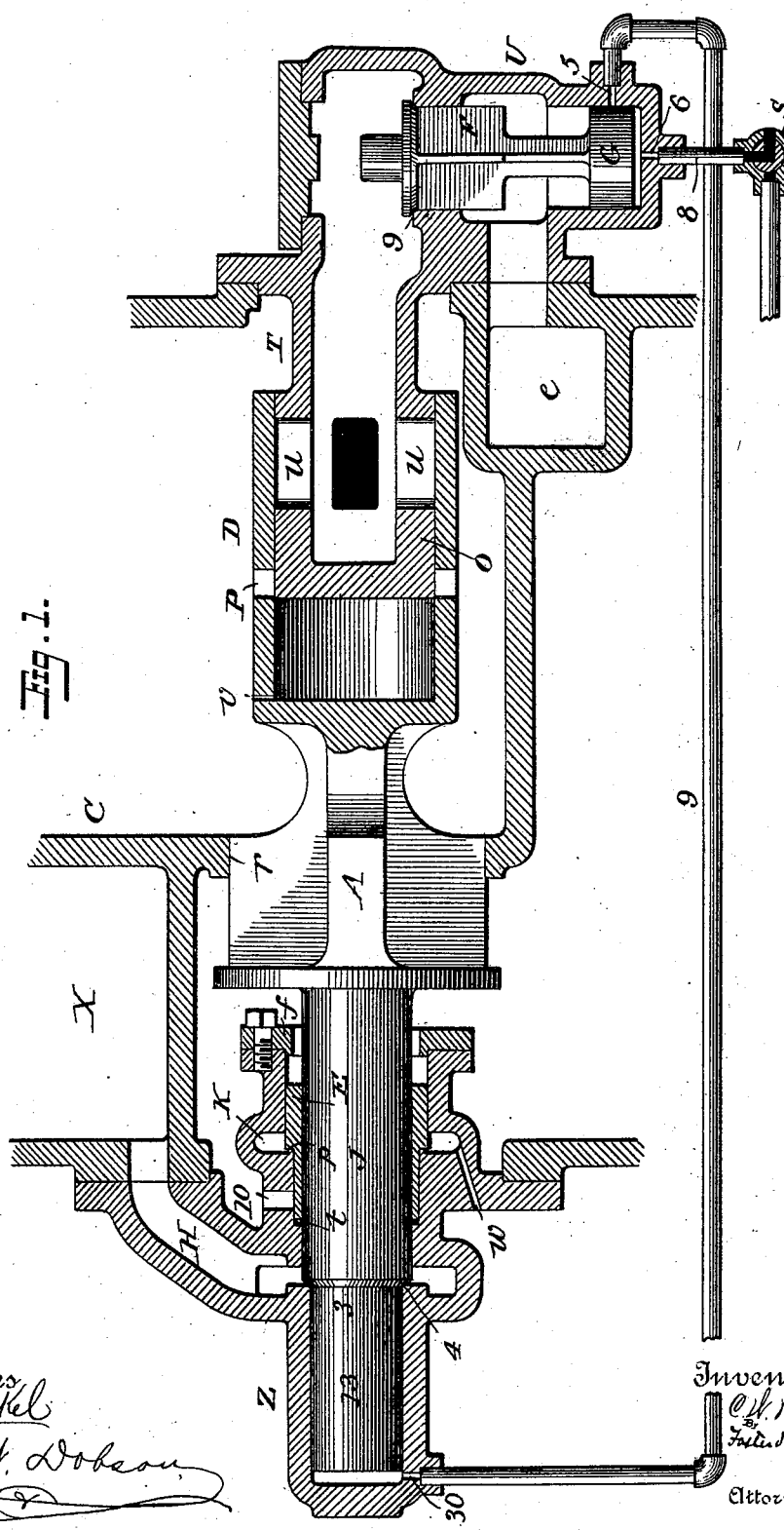
Figure 2:
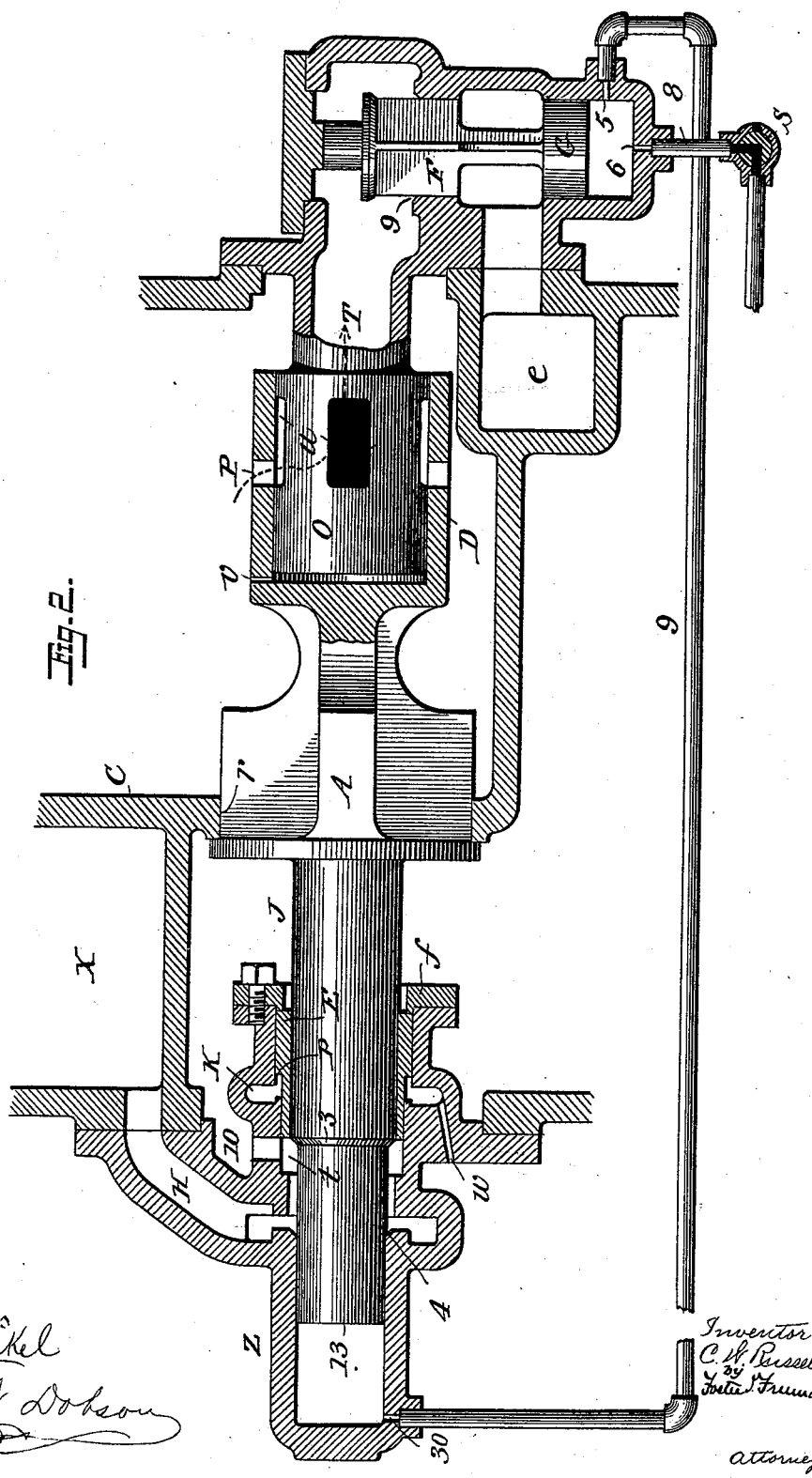

Figure 1 is a longitudinal section of a compound-engine valve device embracing my invention, showing the parts in the position they occupy prior to starting and also when the engine is running compound; Fig. 2, the same, illustrating the position of the parts when the engine is running simple; Fig. 3, a view illustrating a modification.

The case X of the valve device is of any suitable construction. As shown, it constitutes part of the saddles of the engine and has the usual partition C dividing the receiver, with a port $r$, to which is fitted the intercepting-valve A. From the intercepting-valve extends a stem 13, having formed upon it a piston J with a beveled annular face 3 adapted to a narrower annular seat 4 in the chamber H, communicating with the live-steam passage. Upon the enlarged or piston part of the stem 13 of the intercepting-valve slides an annular reduction-valve E, enlarged at one end to form a shoulder or face $p$, which is exposed in an annular chamber K, which communicates through a port $w$ with the atmosphere. The contracted portion of the reduction-valve E extends into an annular chamber around the piston portion J of the stem 13, but does not extend quite to the end of the chamber when the reduction-valve is closed, as shown in Fig 1, so as to leave an intervening space $t$ for a purpose described hereinafter, and a port 10 extends through the casing, as shown, and an annular plate or ring $f$ serves as a stop to limit the movement of the reduction-valve toward the right, the shoulder $p$ limiting its movement toward the left. The extreme end of the reduced portion of the stem 13 extends into a cylinder Z, having a port 30, so that a motor fluid under pressure admitted to said port will act on the end of the said stem to move the intercepting-valve and the admission-valve J, connected therewith, to the right, but without necessarily imparting any movement to the reduction-valve, which is absolutely independent of the admission-valve.

The emergency-valve F is arranged to move vertically and close against a horizontal seat in which is the port 9, which communicates with a hollow horizontal branch or stem T, having at the end a solid head or piston O and radial ports $u$, the said branch or stem extending into the receiver. Upon the head O of the branch or stem slides a hollow cylinder or cup D, which is connected with the intercepting-valve and which is provided with a vent $v$ and with radial ports P.

The port 9, closed by the emergency-valve F, communicates with a chamber $e$, which leads to the stack, and upon the stem of the emergency-valve is a piston G, which fits a cylinder U, and from the port 6 of the said cylinder extends a pipe 8, which communicates with a valve device S, by means of which a motor fluid under pressure—as steam, water, or air—may be introduced into the cylinder U, the said valve device having an air-port and a two-way cock so arranged that by turning the said cock the cylinder U may be put into communication with the atmosphere, so as to discharge the contents of the said cylinder.

The cylinder U is provided with a port 5, so arranged as to be uncovered as the emergency-valve is fully opened, and a pipe 9 extends from the port 5 to the port 30 of the cylinder Z, so that after the emergency-valve has been raised to its full extent the motor fluid will pass from the cylinder U to the cylinder Z and impart motion to the spindle-piston 13 and to the admission and intercepting valves.

Assuming the parts to be in the position shown in Fig. 1 at the time of starting the apparatus, the live steam admitted to the chamber H, acting upon the exposed portion of the face 3, will throw the admission-valve J to the right until the shoulder 3 passes beyond the port 10 to the right thereof and steam under pressure passes into the space $t$, and thereby acting on the end of the reduction-valve forces the latter to the right until the port 10 is uncovered, when the live steam will pass into the receiver and to the low-pressure engine, which will then work simple with the high-pressure engine, to which the steam has also been admitted. When the parts are in this position, the pressure upon the different areas of the reduction-valve will so shift the latter as to maintain the desired difference of pressure between the live-steam passage and the receiver communicating with the low-pressure engine. When the pressure on the high pressure side of the intercepting-valve becomes sufficiently great from the passage of the exhaust from the high-pressure engine to the receiver, said intercepting-valve will be thrown to the left until the face 3 of the valve-piston J is brought positively against the face 4, thereby closing the passage of live steam through the passage H, and the superior pressure upon the end of the reduction-valve E will then throw the latter to the left, closing the ports 10.

It will be seen that by providing the reducing-valve with a shoulder between its ends and exposing this shoulder to the pressure of the atmosphere I am enabled to secure the desired differential pressures upon the opposite ends of the reduction-valve to secure its desired operation.

In case of emergency—as, for instance, where additional power is required in consequence of the engine having to ascend an incline (in cases where the apparatus is used in connection with a locomotive-engine)—the opening of the emergency-valve F will permit the exhaust from the high-pressure engine to pass from the receiver and the intercepting-valve to be closed, so that the engines will then run simple.

If the communication with the receiver was formed the instant that the emergency-valve left its seat, there would be a reduction of pressure in the receiver before the intercepting-valve A was closed and the admission-valve J was opened. I have therefore provided the cylinder D with its ports P sliding upon the branch T with its ports $u$, so that the ports P and $u$ will not be brought into communication and open communication between the receiver and the port 9 of the valve F until the intercepting-valve has nearly reached its seat, when the desired communication will at once be established.

It will be evident that the piston O, in connection with the cup D, not only serves as a means of securing and cutting off the communication between the receiver and the port 9, but also constitutes a guide or bearing for the spindle of the intercepting-valve, and it will be seen, further, that it constitutes a dash-pot, as after the ports P have passed over the end of the head or piston O the steam within the cup D will become compressed and can only escape slowly through the vent $v$, forming a dash-pot, which will gradually reduce the rapidity of the movement of the intercepting-valve and bring the same lightly to its seat.

I do not here claim, broadly, the arrangement of a dash-pot between the intercepting-valve A and the exhaust-valve F, as this constitutes the subject of a separate application for Letters Patent, Serial No. 504,989; but the arrangement which I have above described is very simple and effective, serves as a guide for the stem of the intercepting-valve, and can be employed when the emergency-valve is in a vertical position, and is more simple and has other advantages over the construction described in the aforesaid application.

In order that the intercepting-valve A may at once be shifted after the emergency-valve is fully opened, I have arranged the port 5 as above described, so that after the emergency-valve has been fully raised the port is uncovered to thereby carry the motor fluid from the cylinder U to the cylinder Z, where it acts upon the stem of the intercepting-valve and forces the latter to the right, also carrying with it the admission-valve and opening the flow of live steam to the low-pressure cylinder.

By the arrangement of the emergency-valve in a vertical position I am enabled to dispense with the use of springs or other appliances for keeping it closed. I insure an instant closure under all circumstances where power is not directly applied to open it, and by arranging the piston G in connection with the ports 5 and 6 and the cylinder Z and its piston as above described I make the piston G practically the controlling-valve for governing the flow of motor fluid to the cylinder Z.

In Fig. 3 I have illustrated an arrangement of the annular independent reducing-valve so as to control the flow of the live steam to the admission-valve. In this construction the ports 10 are in the annular reducing-valve, so as to be put in communication with the passage H when the ports $g$ of the reducing-valve are brought opposite said passage and when the shoulder or face 3 of the admission-valve passes beyond the ports 10, as shown in dotted lines.

I do not claim as my invention the interposing of a reducing-valve between the live-steam passage H and the admission-valve.

Without limiting myself to the precise construction and arrangement of parts shown, I claim as my invention—

1. The combination in the valve device of a compound engine of an intercepting valve, a stem projecting therefrom and a tubular reducing valve movable upon said stem and supported to be at all times wholly independent of the intercepting valve and regulating the flow of steam to the low pressure engine, substantially as described.

2. The combination with the intercepting valve and with the live steam channel, of a valve connected directly with the intercepting valve and controlling the live steam port, and a tubular valve E located on the stem of said live steam port valve and controlling the flow of steam from said port to the low pressure engine, substantially as described.

3. The combination of the intercepting valve, admission valve connected directly therewith, and tubular reducing valve, said reducing valve being located on the stem of the admission valve, and controlling the flow of steam from the admission valve to the low pressure engine, substantially as described.

4. The combination with the intercepting valve and its stem, of an admission valve formed upon said stem, and an independent reduction valve carried by said stem, substantially as described.

5. The combination with the intercepting valve and admission valve, of an intermediate reduction valve controlling the flow of steam from the admission valve to the low pressure engine, said reduction valve having between its ends a shoulder exposed to a chamber communicating with the atmosphere, substantially as described.

6. The combination of the intercepting valve, admission channel H, valve piston having an annular face 3 fitted to and projecting radially beyond a seat in said channel, a port 10 in the valve casing, and a reduction valve extending into a chamber communicating with said port, substantially as set forth.

7. The combination of the intercepting valve, a piston connected to said intercepting valve and fitting a cylinder, and an emergency valve vertically movable to and from a port having a horizontal seat, a piston connected to said emergency valve and fitting a cylinder, and acting by its weight to aid in seating the valve and means for successively directing a motor fluid to and from said cylinders.

8. The combination with an admission valve and emergency valve of motors for operating said valves, the supply port of the admission valve motor connected with a port of the emergency valve cylinder and arranged to be opened after the emergency valve is moved from its seat, substantially as described.

9. The combination of the intercepting valve and stem thereof extending into a cylinder Z, and emergency valve having a piston fitting a cylinder U and means for directing a motor fluid to both cylinders, and thereby opening the emergency valve and closing the intercepting valve in quick succession substantially as described.

10. The combination of the intercepting valve and stem thereof extending into a cylinder Z, an emergency valve having a piston fitting a cylinder U, a port admitting a motor fluid to the emergency valve cylinder and a pipe connecting a port 5 of the emergency valve cylinder with the cylinder Z, substantially as described.

In testimony whereof I have signed my name to this specification in the presence of two subscribing witnesses.

CLINTON W. RUSSELL.

Witnesses:
CHARLES E. FOSTER,
G. P. KRAMER.